(12) United States Patent
Okazaki

(10) Patent No.: US 8,345,074 B2
(45) Date of Patent: Jan. 1, 2013

(54) LIGHT-EMITTING DEVICE, PRINT HEAD AND IMAGE FORMING APPARATUS

(75) Inventor: Sachiya Okazaki, Mie (JP)

(73) Assignee: Fuji Xerox Co., Ltd., Tokyo (JP)

( * ) Notice: Subject to any disclaimer, the term of this patent is extended or adjusted under 35 U.S.C. 154(b) by 457 days.

(21) Appl. No.: 12/550,495

(22) Filed: Aug. 31, 2009

(65) Prior Publication Data

US 2010/0225728 A1    Sep. 9, 2010

(30) Foreign Application Priority Data

Mar. 5, 2009    (JP) ................. 2009-052621

(51) Int. Cl.
B41J 2/385    (2006.01)
G03G 13/04    (2006.01)
G01D 15/06    (2006.01)
G03G 15/01    (2006.01)
B41J 2/45    (2006.01)

(52) U.S. Cl. ........ 347/130; 347/111; 347/119; 347/129; 347/132; 347/238

(58) Field of Classification Search .................. 347/238, 347/111, 119, 129, 130, 132
See application file for complete search history.

(56) References Cited

U.S. PATENT DOCUMENTS

| | | | |
|---|---|---|---|
| 6,232,724 B1 * | 5/2001 | Onimoto et al. | 315/161 |
| 6,828,666 B1 * | 12/2004 | Herrell et al. | 257/691 |
| 6,924,562 B2 * | 8/2005 | Kinoshita | 257/698 |
| 7,286,147 B2 | 10/2007 | Yamazaki et al. | |
| 7,499,067 B2 | 3/2009 | Yamazaki et al. | |
| 7,760,531 B2 * | 7/2010 | Nishio et al. | 365/51 |
| 2005/0146593 A1 | 7/2005 | Yamazaki et al. | |
| 2006/0138638 A1 * | 6/2006 | Komatsu | 257/700 |
| 2008/0012925 A1 | 1/2008 | Yamazaki et al. | |
| 2008/0130021 A1 * | 6/2008 | Inoue et al. | 358/1.7 |
| 2008/0266031 A1 | 10/2008 | Uematsu et al. | |
| 2009/0141113 A1 | 6/2009 | Yamazaki et al. | |

FOREIGN PATENT DOCUMENTS

| | | |
|---|---|---|
| JP | 62-123944 | 8/1987 |
| JP | 10-006552 | 1/1998 |
| JP | 11-188914 | 7/1999 |
| JP | 2003-229672 | 8/2003 |
| JP | 2005-153372 | 6/2005 |
| JP | 2008-258312 | 10/2008 |

* cited by examiner

*Primary Examiner* — Laura Martin
*Assistant Examiner* — Jeremy Bishop
(74) *Attorney, Agent, or Firm* — Fildes & Outland, P.C.

(57) ABSTRACT

A light-emitting device includes: a board; plural light-emitting chips that are one-dimensionally arrayed in a longitudinal direction of the board and that are connected to a first potential and a second potential; and plural capacitors that each include a first electrode and a second electrode arranged in a short-side direction of the board, and that are arrayed in the longitudinal direction of the board so that the first electrode and the second electrode are alternately positioned between each adjacent two of the capacitors. The first electrode is connected to the first potential for the light-emitting chips, and the second electrode is connected to the second potential for the light-emitting chips.

9 Claims, 10 Drawing Sheets

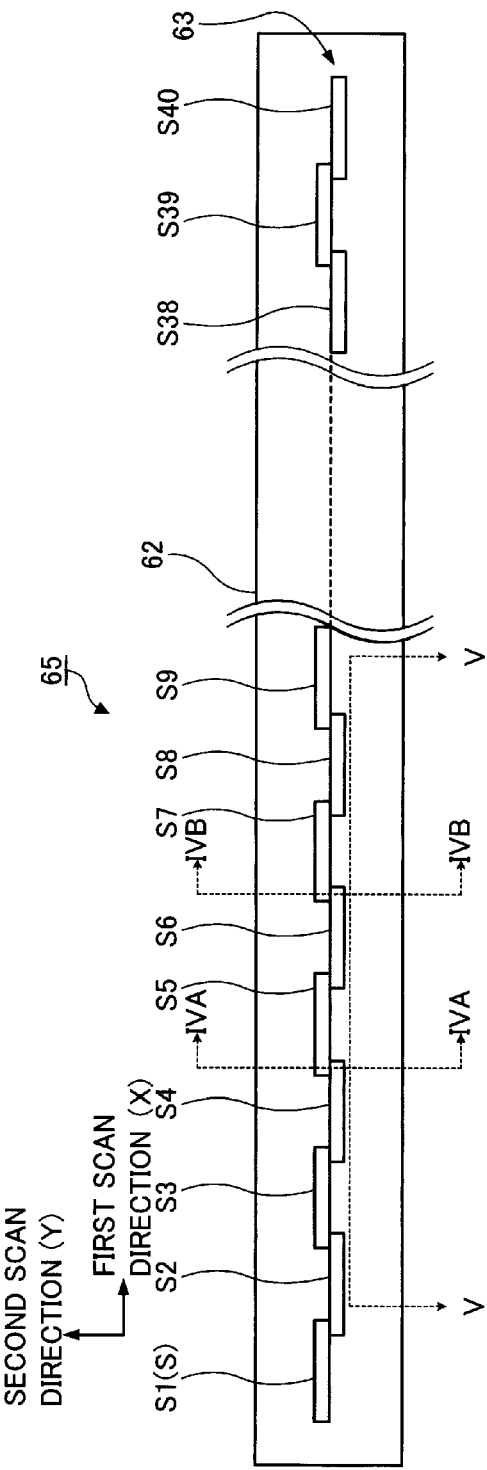
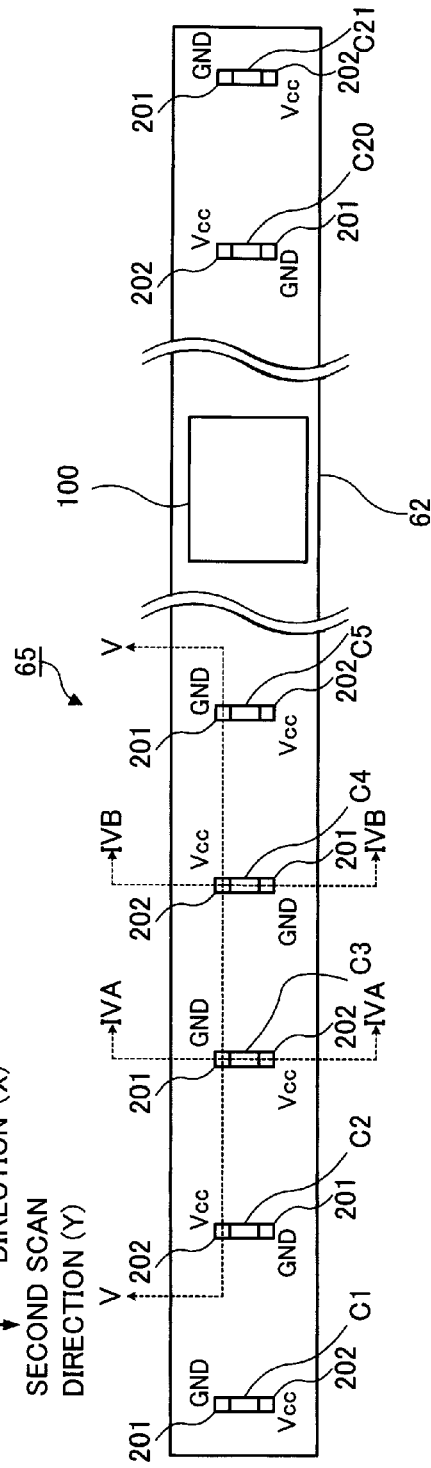
FIG.3A
FIG.3B

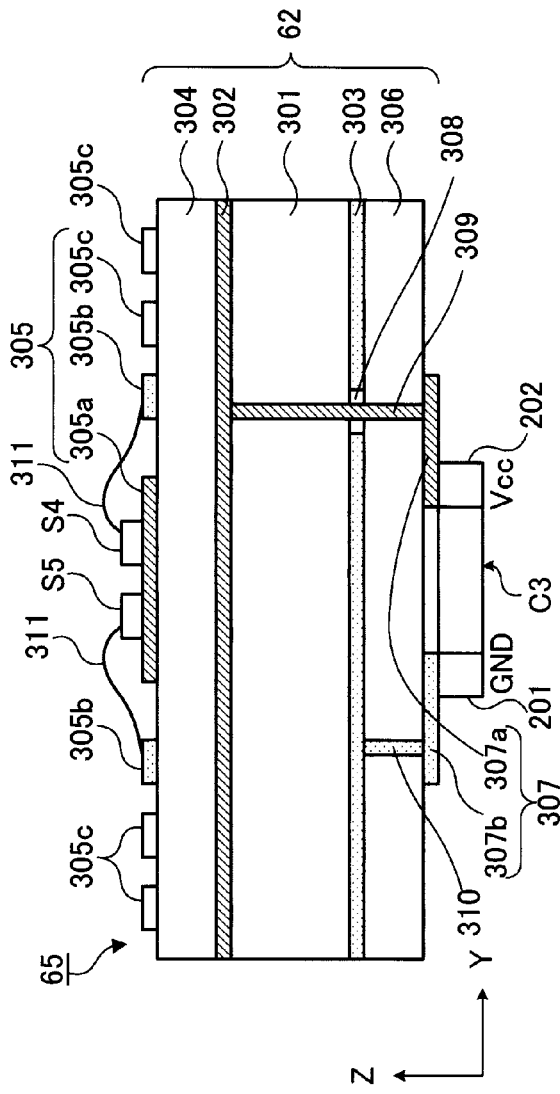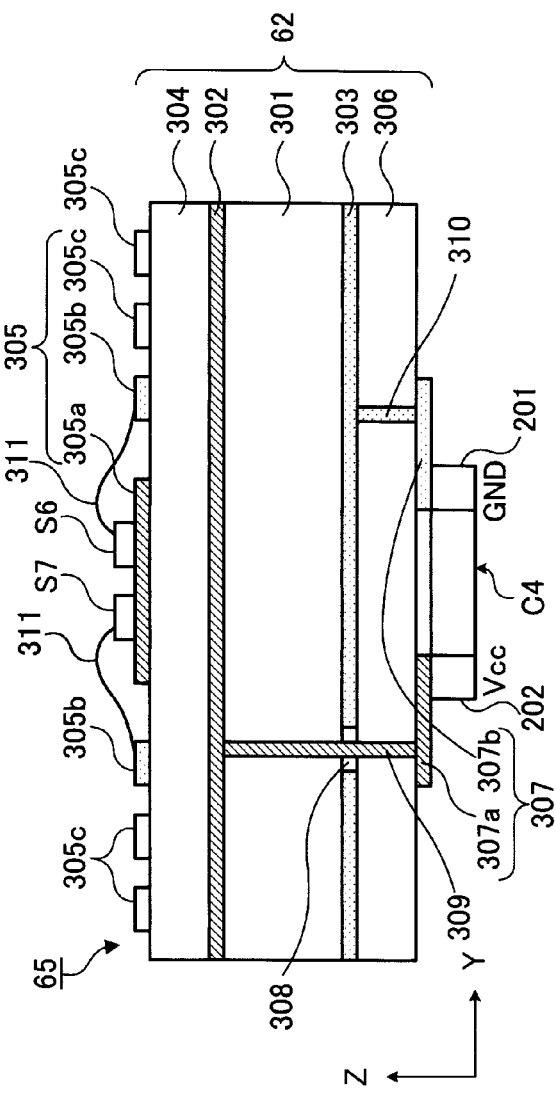

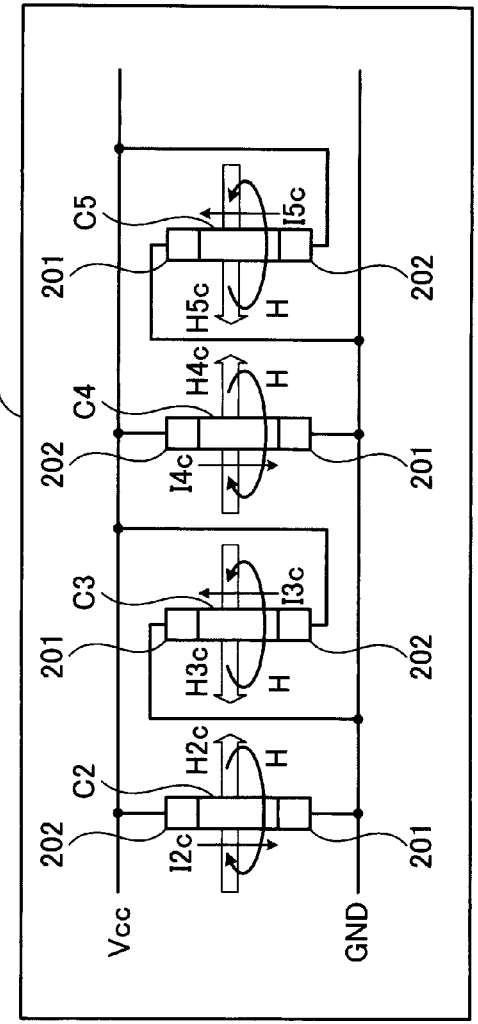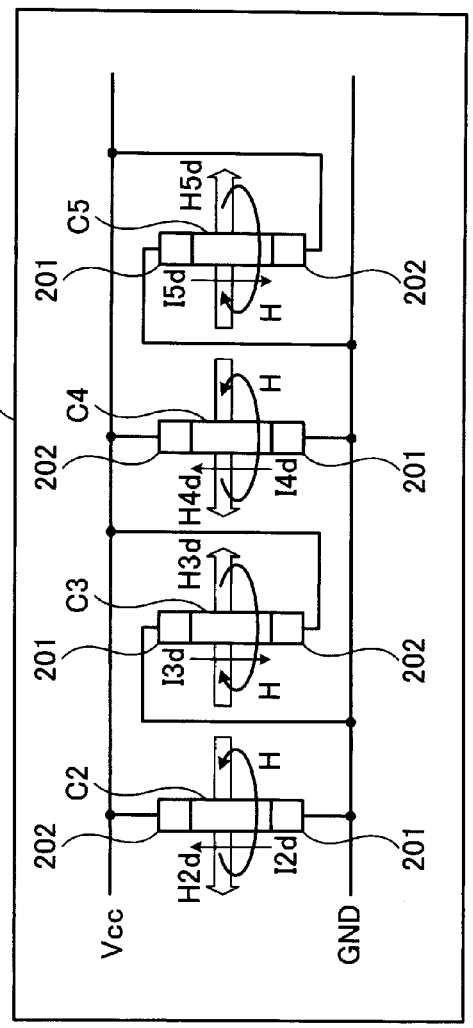
FIG.9A
FIG.9B

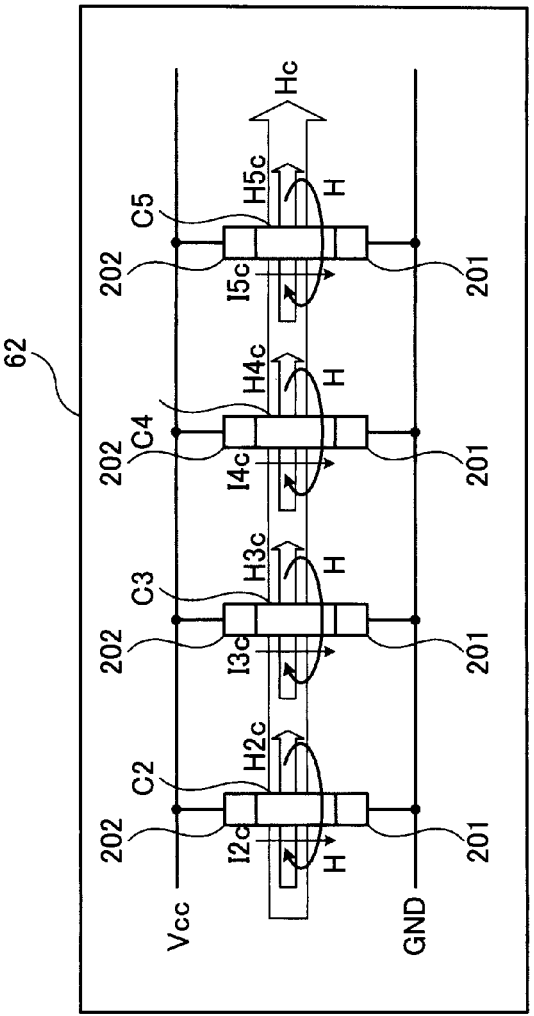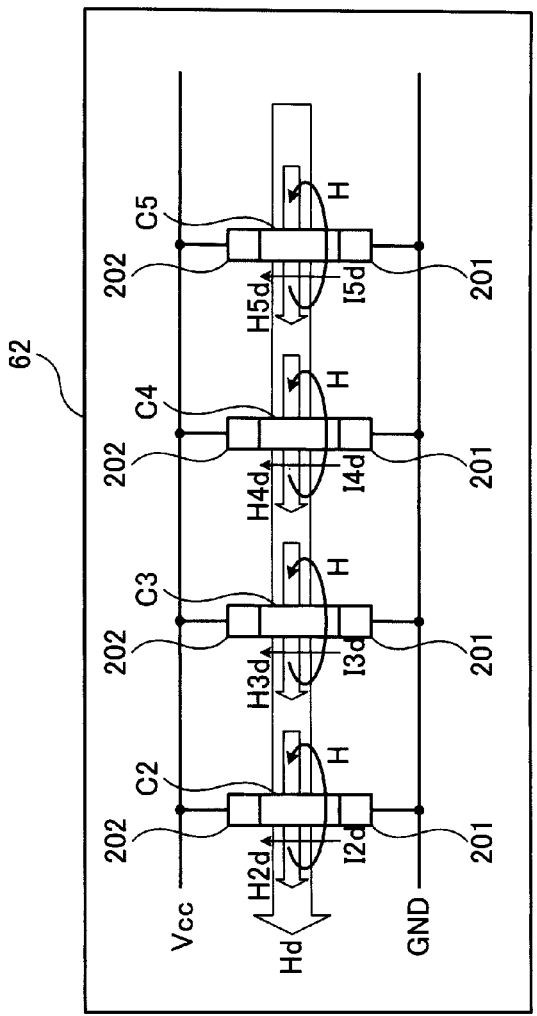
FIG.10A
FIG.10B

LIGHT-EMITTING DEVICE, PRINT HEAD AND IMAGE FORMING APPARATUS

CROSS REFERENCE TO RELATED APPLICATIONS

This application is based on and claims priority under 35 USC §119 from Japanese Patent Application No. 2009-052621 filed Mar. 5, 2009.

BACKGROUND

1. Technical Field

The present invention relates to a light-emitting device, a print head and an image forming apparatus.

2. Related Art

In an electrophotographic image forming apparatus such as a printer, a copier or a facsimile machine, an image is formed on a recording paper sheet as follows. Firstly, an electrostatic latent image is formed on a uniformly charged photoconductor by causing an optical recording unit to emit light so as to transfer image information onto the photoconductor. Then, the electrostatic latent image is made visible by being developed with toner. Lastly, the toner image is transferred on and fixed to the recording paper sheet. In addition to an optical-scanning recording unit that performs exposure by laser scanning in the first scan direction using a laser beam, a recording device using the following LED print head (LPH) has been employed as such an optical recording unit in recent years in response to demand for downsizing the apparatus. This LPH includes a large number of light emitting diodes (LEDs), serving as light-emitting elements, arrayed in the first scan direction.

SUMMARY

According to an aspect of the present invention, there is provided a light-emitting device including: a board; plural light-emitting chips that are one-dimensionally arrayed in a longitudinal direction of the board and that are connected to a first potential and a second potential; and plural capacitors that each include a first electrode and a second electrode arranged in a short-side direction of the board, and that are arrayed in the longitudinal direction of the board so that the first electrode and the second electrode are alternately positioned between each adjacent two of the capacitors. The first electrode is connected to the first potential for the light-emitting chips, and the second electrode is connected to the second potential for the light-emitting chips.

BRIEF DESCRIPTION OF THE DRAWINGS

Exemplary embodiment(s) of the present invention will be described in detail based on the following figures, wherein:

FIGS. 3A and 3B are diagrams for illustrating a planar layout of the light-emitting device;

FIGS. 4A and 4B are diagrams for illustrating a cross-sectional structure of the light-emitting device;

FIGS. 9A and 9B are equivalent circuits for illustrating magnetic fields generated by charge and discharge of the bypass capacitors in the light-emitting device to which the present exemplary embodiment is applied; and FIGS. 10A and 10B are equivalent circuits for illustrating magnetic fields generated by charge and discharge of the bypass capacitors in the light-emitting device to which the present exemplary embodiment is not applied.

DETAILED DESCRIPTION

Hereinafter, a detailed description will be given of a best mode (hereinafter referred to as exemplary embodiment) for carrying out the present invention with reference to the accompanying drawings.

Figure 1:
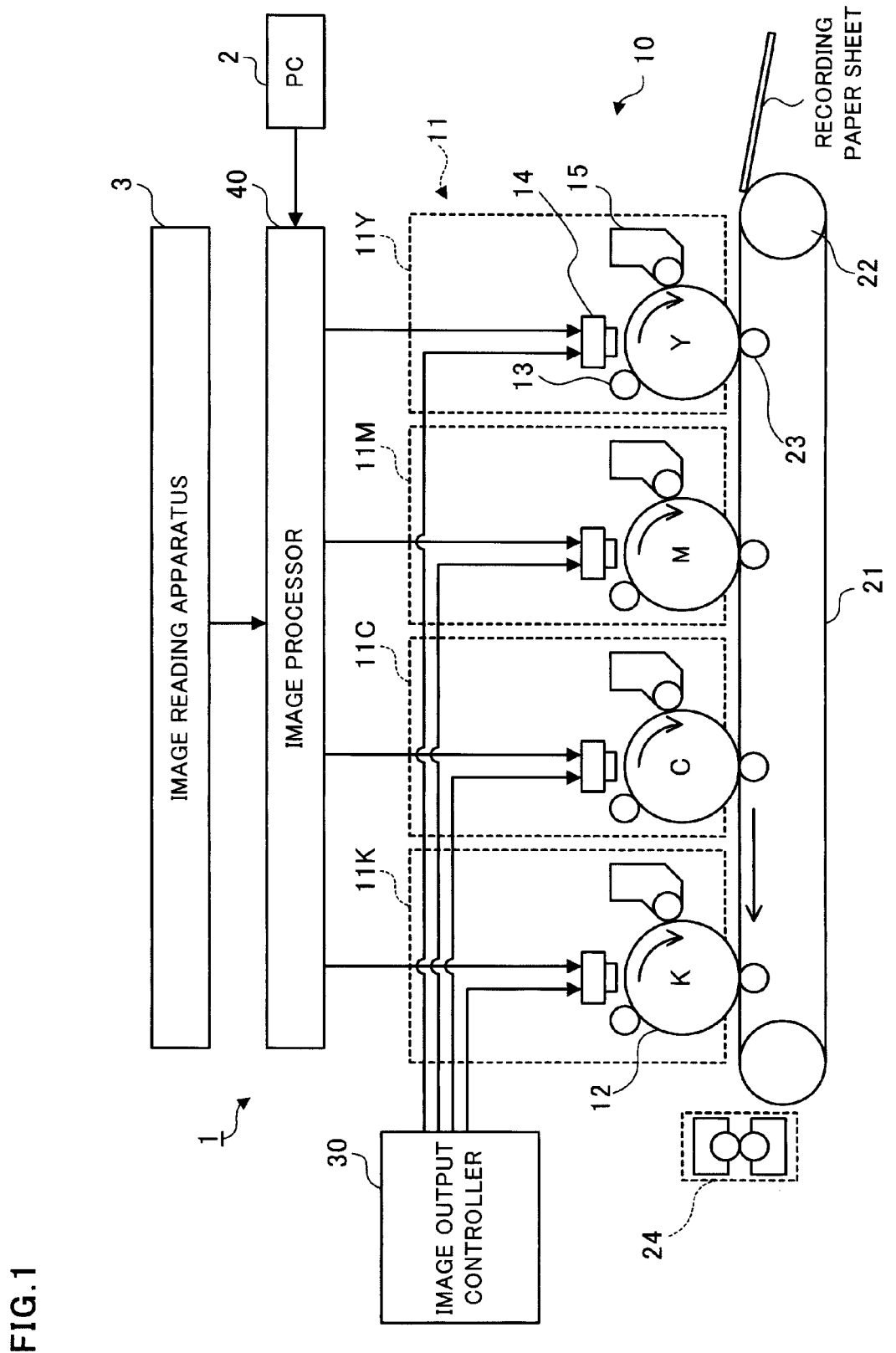
FIG. 1 is a diagram showing an example of an overall configuration of an image forming apparatus to which the present exemplary embodiment is applied.

FIG. 1 is a diagram showing an example of an overall configuration of an image forming apparatus 1 to which the present exemplary embodiment is applied. The image forming apparatus 1 shown in FIG. 1 is what is generally termed as a tandem image forming apparatus. The image forming apparatus 1 includes an image forming process unit 10, an image output controller 30 and an image processor 40. The image forming process unit 10 forms an image in accordance with different color image data sets. The image output controller 30 controls the image forming process unit 10. The image processor 40, which is connected to devices such as a personal computer (PC) 2 and an image reading apparatus 3, performs predefined image processing on image data received from the above devices.

The image forming process unit 10 includes image forming units 11. The image forming units 11 are formed of multiple engines placed in parallel at regular intervals. Specifically, the image forming units 11 are formed of four image forming units 11Y, 11M, 11C and 11K. Each of the image forming units 11Y, 11M, 11C and 11K includes a photoconductive drum 12, a charging device 13, a print head 14 and a developing device 15. On the photoconductive drum 12, which is an example of an image carrier, an electrostatic latent image is formed, and the photoconductive drum 12 retains a toner image. The charging device 13, an example of a charging unit, uniformly charges the surface of the photoconductive drum 12 at a predetermined potential. The print head 14 exposes the photoconductive drum 12 charged by the charging device 13. The developing device 15, an example of a developing unit, develops an electrostatic latent image formed by the print head 14. Here, the image forming units 11Y, 11M, 11C and 11K have approximately the same configuration excluding color of toner put in the developing device 15. The image forming units 11Y, 11M, 11C and 11K form yellow (Y), magenta (M), cyan (C) and black (K) toner images, respectively.

In addition, the image forming process unit 10 further includes a sheet transport belt 21, a drive roll 22, transfer rolls 23 and a fixing device 24. The sheet transport belt 21 transports a recording sheet so that different color toner images respectively formed on the photoconductive drums 12 of the image forming units 11Y, 11M, 11C and 11K are transferred on the recording sheet by multilayer transfer. The drive roll 22 drives the sheet transport belt 21. Each transfer roll 23, an example of a transfer unit, transfers a toner image formed on the corresponding photoconductive drum 12 onto the recording sheet. The fixing device 24 fixes the toner images on the recording sheet.

Figure 2:
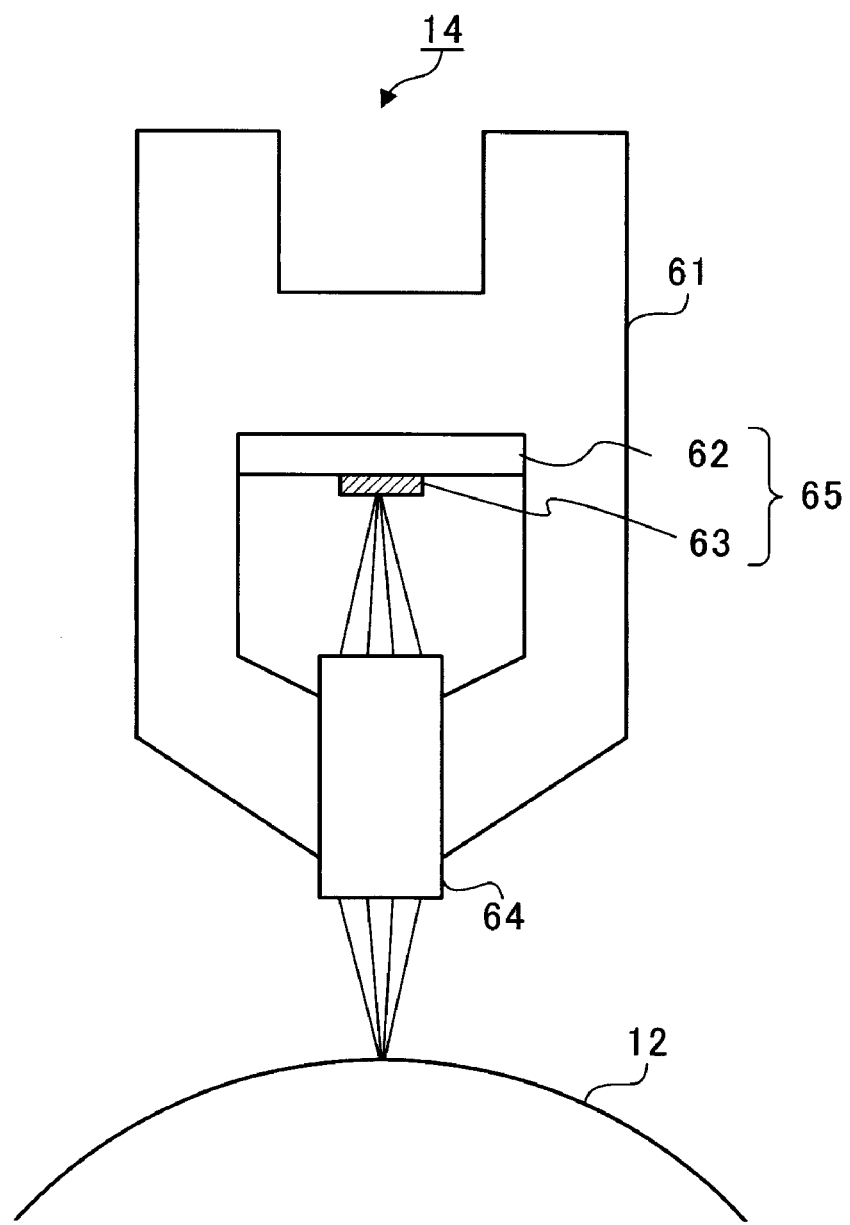
FIG. 2 is a diagram showing a structure of the print head to which the present exemplary embodiment is applied.

FIG. 2 is a diagram showing a structure of the print head 14 to which the present exemplary embodiment is applied. The print head 14 includes a housing 61, a light-emitting portion 63, a circuit board 62 and a rod lens array 64. The light-emitting portion 63 includes multiple LEDs (light-emitting thyristors in the present exemplary embodiment). On the circuit board 62, which is as an example of aboard, the light-emitting portion 63, a signal generating circuit 100 (see FIG. 3 to be described later) driving the light-emitting portion 63, and the like are mounted. The rod lens array 64, an example of an optical unit, focuses light emitted by the light-emitting portion 63 onto the surface of the photoconductive drum 12.

Hereinbelow, the circuit board 62, the light-emitting portion 63 mounted on the circuit board 62, the signal generating circuit 100 and the like will be collectively referred to as light-emitting device 65 that an exposure unit includes.

The housing 61 is made of metal, for example, and supports the light-emitting device 65. The housing 61 is set so that the light-emitting point of the light-emitting portion 63 is located on the focal plane of the rod lens array 64. In addition, the rod lens array 64 is arranged along an axial direction of the photoconductive drum 12.

FIGS. 3A and 3B are diagrams for illustrating a planar layout of the light-emitting device 65. FIGS. 3A and 3B are front-side and back-side views of the light-emitting device 65, respectively.

As shown in FIG. 3A, the longer sides of the circuit board 62 extend in the first scan direction (X direction). The light-emitting portion 63 is formed of, for example, 40 light-emitting chips S (S1 to S40) arrayed in a zigzag pattern on the front surface of the circuit board 62. Specifically, the light-emitting chips S1 to S40 are arrayed one-dimensionally in two straight lines extending in the longitudinal direction of the circuit board 62 (X direction). In the following description, when need not be distinguished from one another, the light-emitting chips S1 to S40 will be referred to as light-emitting chips S.

On the other hand, as shown in FIG. 3B, 21 bypass capacitors C (C1 to C21) and the signal generating circuit 100 are provided on the back surface of the circuit board 62. Each of the bypass capacitors C1 to C21, an example of a capacitor, is provided to prevent the power supply (Vcc) potential from sharply dropping (changing). In the following description, when need not be distinguished from one another, the bypass capacitors C1 to C21 will be referred to as bypass capacitors C. In addition, although not shown in FIG. 3B, connectors are also provided on the back surface of the circuit board 62. The connectors are provided to connect lines through which the light-emitting device 65 is supplied with control signals outputted by the image output controller 30 and image data outputted by the image processor 40.

Note that, in the present exemplary embodiment, the signal generating circuit 100 is provided at the middle of the circuit board 62 in the longitudinal direction thereof (X direction).

Additionally, in the circuit board 62, the surface provided with the light-emitting chips S and the surface provided with the bypass capacitors C are referred to as front and back surfaces of the circuit board 62, respectively.

Each of the bypass capacitors C (C1 to C20) is provided for every two, for example, of the light-emitting chips S (S1 to S40). In addition, the bypass capacitor C21 is provided at an end of the light-emitting portion 63 (on the right side of FIG. 3B). That is, the bypass capacitors C (C1 to C21) are arrayed side by side in the longitudinal direction of the circuit board 62 (X direction). Each of the bypass capacitors C (C1 to C21) includes a GND electrode 201 and a Vcc electrode 202. The GND electrode 201, an example of a first electrode, is connected to a ground (GND) potential, an example of a first potential. The Vcc electrode 202, an example of a second electrode, is connected to a power supply (Vcc) potential, an example of a second potential. The GND electrode 201 and the Vcc electrode 202 of each bypass capacitor C are placed side by side in the short-side direction of the circuit board 62. The GND potential serves as a reference potential for the light-emitting chips S, and is 0 V, for example. The Vcc potential serves as a power supply potential for the light-emitting chips S, and is 3.3 V, for example. Here, the short-side direction of the circuit board 62 is the second scan direction (Y direction) perpendicular to the longitudinal direction (X direction). Note that, since FIGS. 3A and 3B show sides opposite to each other, the Y direction shown in FIG. 3A is reversed from that in FIG. 3B.

The bypass capacitors C are arranged so that, between each adjacent two of the bypass capacitors C, the position relation of the GND electrode 201 and the Vcc electrode 202 is inverted in the vertical direction of FIG. 3B. Specifically, in the bypass capacitor C1, the GND electrode 201 and the Vcc electrode 202 are positioned on the upper and lower sides of FIG. 3B, respectively. In the by pass capacitor C2 located immediately to the right of the bypass capacitor C1 in FIG. 3B, the Vcc electrode 202 and the GND electrode 201 are positioned on the upper and lower sides of FIG. 3B, respectively. In the bypass capacitor C3 located immediately to the right of the bypass capacitor C2 in FIG. 3B, the GND electrode 201 and the Vcc electrode 202 are positioned on the upper and lower sides of FIG. 3B, respectively, as in the bypass capacitor C1. The subsequent bypass capacitors C4 to C21 are arranged in a similar manner.

As described above, in the present exemplary embodiment, each bypass capacitor C is placed so that the two electrodes therein are arranged side by side in the short-side direction of the circuit board 62. In addition, the bypass capacitors C are arranged so that the electrode (GND electrode 201) connected to the GND potential and the electrode (Vcc electrode 202) connected to the Vcc potential are alternately positioned between each adjacent two of the bypass capacitors C.

Note that, in FIG. 3B, the GND electrodes 201 and the Vcc electrodes 202 are respectively indicated by "GND" and "Vcc," for simplicity.

Figure 5:
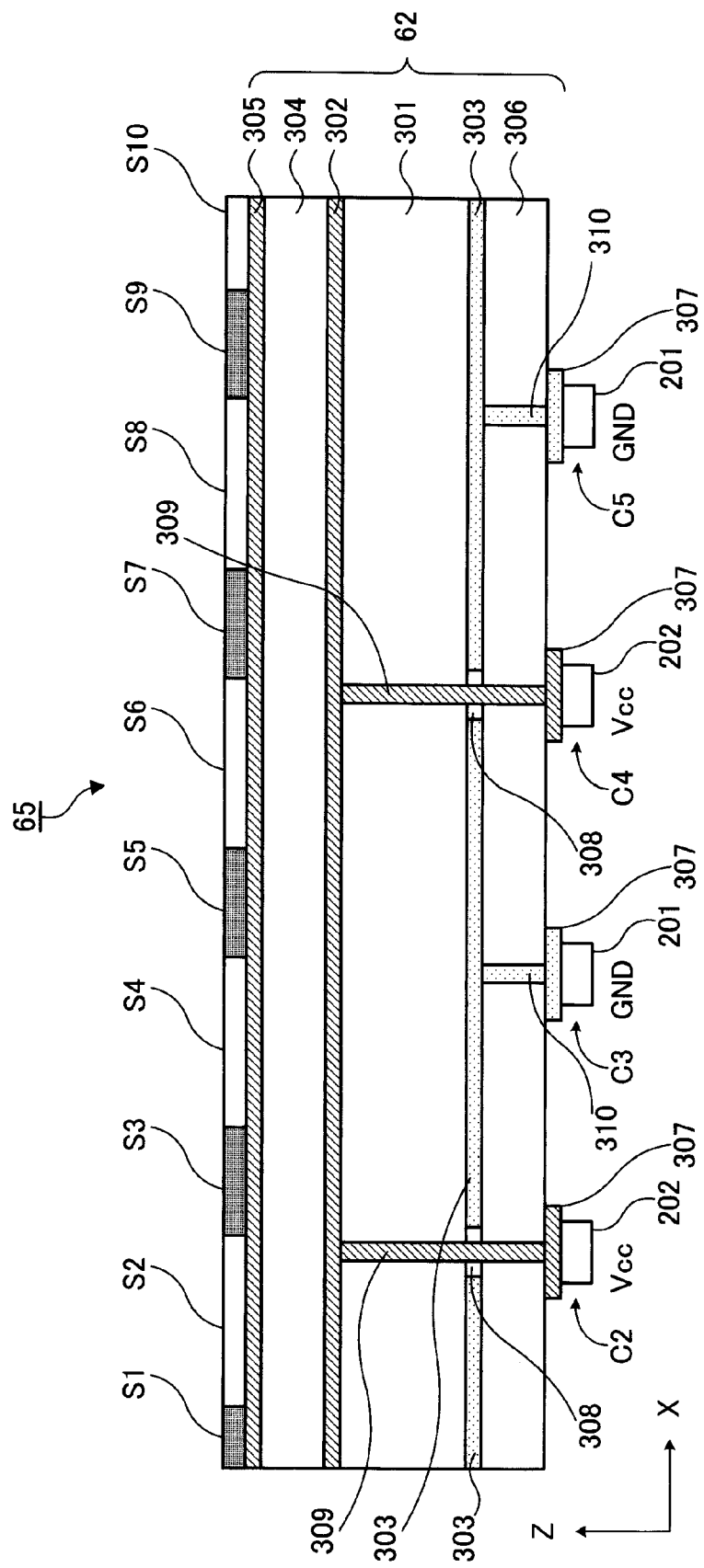
FIG. 5 is a diagram for illustrating a cross-sectional structure of the light-emitting device.

FIGS. 4A to 5 are diagrams for illustrating a cross-sectional structure of the light-emitting device 65. FIG. 4A shows a cross-sectional structure (including the bypass capacitor C3) taken along the IVA-IVA line in FIGS. 3A and 3B. FIG. 4B shows a cross-sectional structure (including the bypass capacitor C4) taken along the IVB-IVB line in FIGS. 3A and 3B. In each of FIGS. 4A and 4B, the horizontal and upward directions are the Y direction and a Z direction, respectively.

FIG. 5 shows a cross-sectional structure (including the bypass capacitors C2 to C5) taken along the V-V line in FIGS. 3A and 3B. In FIG. 5, the horizontal and upward directions are the X direction and the Z direction, respectively. Note that FIG. 5 shows the cross-sectional structure taken along the line connecting the centers of the electrodes (either the GND electrode 201 or the Vcc electrode 202), located on one side, of the bypass capacitors C2 to C5.

Firstly, the circuit board 62 will be described using FIG. 4A.

The circuit board 62 includes a core layer 301, a power supply (Vcc) layer 302 and a ground (GND) layer 303. The core layer 301 is made of an insulating material, and is placed in the middle in the thickness direction. The Vcc layer 302 is made of a conductive material, is placed on the upper surface ("upper surface" here and hereinafter refers to the surface on the upper side of each of FIGS. 4A to 5) of the core layer 301, and is supplied with the power supply (Vcc) potential. The GND layer 303 is made of a conductive material, is placed on the lower surface ("lower surface" here and hereinafter refers to the surface on the lower side of each of FIGS. 4A to 5) of the core layer 301, and is supplied with the ground (GND) potential.

In addition, the circuit board 62 further includes a prepreg layer 304 and an interconnect layer 305. The prepreg layer 304 is made of an insulating material, and is placed on the upper surface of the Vcc layer 302. The interconnect layer 305 is made of a conductive material, and is placed on the upper surface of the prepreg layer 304. The interconnect layer 305 includes interconnects 305a to 305c. The interconnects 305a are connected to the Vcc layer 302, while the interconnects 305b are connected to the GND layer 303. Through the interconnects 305c, transfer signals and light-emission signals are transmitted from the signal generating circuit 100 to the light-emitting chips S (S1 to S40) (see FIG. 6 to be described later).

In addition, the circuit board 62 further includes a prepreg layer 306 and an interconnect layer 307. The prepreg layer 306 is made of an insulating material, and is placed on the lower surface of the GND layer 303. The interconnect layer 307 is made of a conductive material, and is placed on the lower surface of the prepreg layer 306. The interconnect layer 307 includes interconnects 307a and 307b. The interconnects 307a are connected to the Vcc layer 302, while the interconnects 307b are connected to the GND layer 303.

The circuit board 62 further includes interconnects 309, each penetrating the core layer 301, the GND layer 303 and the prepreg layer 306 so as to connect the Vcc layer 302 and the corresponding interconnect 307a. In addition, the GND layer 303 is provided with openings 308 each for preventing the interconnect 309 passing therethrough from being short-circuited to the GND layer 303.

In addition, the circuit board 62 includes interconnects 310 each penetrating the prepreg layer 306 so as to connect the GND layer 303 and the corresponding interconnect 307b.

Although not shown in FIG. 4A, as with the interconnects 309 and 310, the circuit board 62 further includes interconnects each for connecting the Vcc layer 302 and the corresponding interconnect 305a, and interconnects each for connecting the GND layer 303 and the corresponding interconnect 305b. Additionally, the circuit board 62 further includes interconnects, each penetrating the core layer 301, the prepreg layers 304 and 306, the Vcc layer 302 and the GND layer 303 so as to transmit therethrough the transfer signals and the light-emission signals from the signal generating circuit 100 to the light-emitting chips S (S1 to S40). Here, the signal generating circuit 100 is provided at the middle of the back surface of the circuit board 62, and the light-emitting chips S (S1 to S40) are provided on the front surface of the circuit board 62.

Note that the core layer 301 and the prepreg layers 304 and 306 are made of glass epoxy, for example. Meanwhile, conductors, such as the Vcc layer 302, the GND layer 303, the interconnect layers 305 and 307, and the interconnects 309 and 310, are made of copper (Cu).

The multiple interconnects 305c for the transfer signals and the light-emission signals formed on the front surface of the circuit board 62 are arranged side by side in the longitudinal direction of the circuit board 62.

Next, the light-emitting chips S will be described.

In FIG. 4A, the back surfaces of the light-emitting chips S4 and S5 are fixed onto one of the interconnects 305a by using a conductive adhesive. Thereby, each of the light-emitting chips S4 and S5 is supplied with the Vcc potential via a SUB terminal (see FIGS. 6 and 7 to be described later) formed on the back surface thereof. Meanwhile, a GND terminal (see FIGS. 6 and 7 to be described later) of each of the light-emitting chips S4 and S5 is connected to one of the interconnects 305b through a wirebond 311. Thereby, each of the light-emitting chips S4 and S5 is supplied with the GND potential via the GND terminal (see FIGS. 6 and 7 to be described later).

Although not described here, the same holds true for the light-emitting chips S6 and S7 shown in FIG. 4B.

Next, the bypass capacitors C3 and C4 will be described.

Each bypass capacitor C is a ceramic capacitor, for example. Since the ceramic capacitor is non-polarized, the GND electrode 201 and the Vcc electrode 202 are indistinguishable from each other. However, the two electrodes of the bypass capacitor C are respectively referred to as the GND electrode 201 and the Vcc electrode 202 according to the potential (either the GND potential or the Vcc potential) connected thereto, for ease of description.

As shown in FIG. 4A, the GND electrode 201 of the bypass capacitor C3 is connected to one of the interconnects 307b connected to the GND layer 303, and thus supplied with the GND potential. Meanwhile, the Vcc electrode 202 of the bypass capacitor C3 is connected to one of the interconnects 307a connected to the Vcc layer 302, and thus supplied with the Vcc potential.

On the other hand, as shown in FIG. 4B, the Vcc electrode 202 of the bypass capacitor C4 is connected to the one of the interconnects 307a connected to the Vcc layer 302, and thus supplied with the Vcc potential. Meanwhile, the GND electrode 201 of the bypass capacitor C4 is connected to one of the interconnects 307b connected to the GND layer 303, and thus supplied with the GND potential.

In addition, the bypass capacitors C2 and C5, which are not illustrated in FIGS. 4A and 4B, will be described using the cross-sectional structure taken along the X direction, which is the longitudinal direction of the circuit board 62, shown in FIG. 5. The Vcc electrode 202 of the bypass capacitor C2 is connected to the Vcc layer 302. Although not shown in FIG. 5, the GND electrode 201 of the bypass capacitor C2 is connected to the GND layer 303. The GND electrode 201 of the bypass capacitor C5 is connected to the GND layer 303. Although not shown in FIG. 5, the Vcc electrode 202 of the bypass capacitor C5 is connected to the Vcc layer 302.

In other words, in the present exemplary embodiment, the bypass capacitors C2 to C5 are arranged so that the GND electrodes 201 and the Vcc electrodes 202 are alternately positioned in the X direction.

Figure 6:
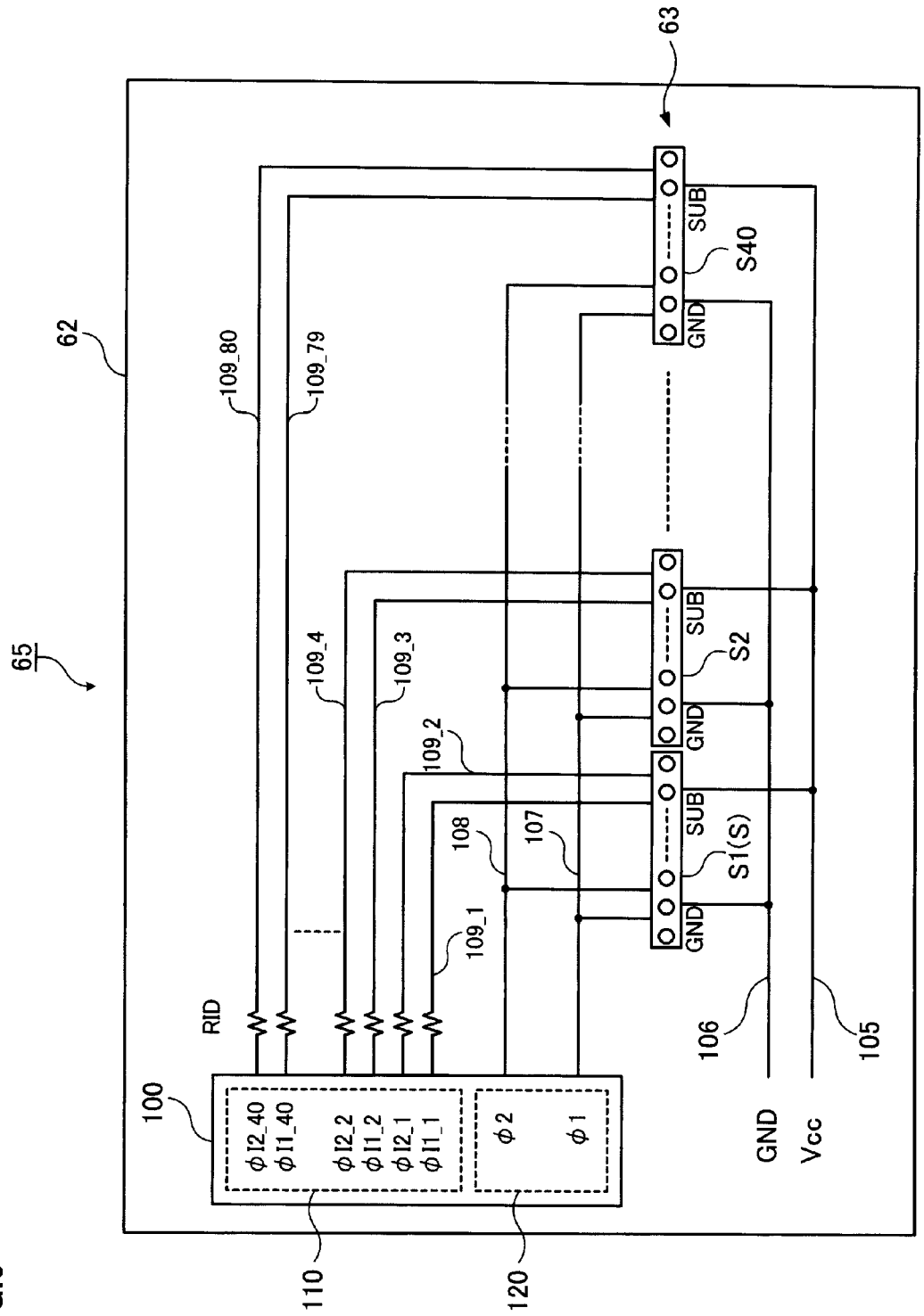
FIG. 6 is a diagram illustrating a configuration of the signal generating circuit mounted on the circuit board in the light-emitting device, and a wiring configuration between the signal generating circuit and the light-emitting chips mounted on the front surface of the circuit board.

FIG. 6 is a diagram illustrating a configuration of the signal generating circuit 100 mounted on the circuit board 62 in the light-emitting device 65, and a wiring configuration between the signal generating circuit 100 and the light-emitting chips S (S1 to S40) mounted on the front surface of the circuit board 62.

The signal generating circuit 100 includes a light-emission signal generating unit 110 and a transfer signal generating unit 120. Although not shown in FIG. 6, from the image output controller 30 and the image processor 40 (see FIG. 1), the various control signals and image data on which the image processing has been performed are inputted to the signal generating circuit 100. Based on the image data and the various control signals, the signal generating circuit 100 performs processing such as the sorting of the image data and the correction of the light-emission intensity.

The light-emission signal generating unit 110 outputs first light-emission signals φI1 (φI1_1 to φI1_40) and second light-emission signals φI2 (φI2_1 to φI2_40) respectively to the light-emitting chips S (S1 to S40). In other words, the light-emission signal generating unit 110 outputs a pair of the first and second light-emission signals φI1 and φI2 to each light-emitting chip S. For example, the light-emission signal generating unit 110 outputs the first and second light-emission signals φI1_1 and φI2_1 to the light-emitting chip S1, and outputs the first and second light-emission signals φI1_2 and φI2_2 to the light-emitting chip S2. The light-emission signal generating unit 110 outputs the first light-emission signals φI1_3 to φI1_40 and the second light-emission signals φI2_3 to φI2_40 to the other light-emitting chips S3 to S40 in a similar manner.

Meanwhile, based on the various control signals, the transfer signal generating unit 120 outputs a first transfer signal φ1 and a second transfer signal φ2 to the light-emitting chips S1 to S40.

The circuit board 62 is provided with a power supply line 105 and a power supply line 106. Through the power supply line 105, the Vcc potential is supplied to the SUB terminals of the respective light-emitting chips S (S1 to S40), and through the power supply line 106, the GND potential is supplied to the GND terminals of the respective light-emitting chips S (S1 to S40), as described above.

In addition, the circuit board 62 is provided with a first transfer signal line 107 and a second transfer signal line 108. The transfer signal generating unit 120 of the signal generating circuit 100 transmits, to the light-emitting portion 63, the first and second transfer signals φ1 and φ2 through the respective first and second transfer signal lines 107 and 108. In addition, the circuit board 62 is also provided with 80 light-emission signal lines 109 (109_1 to 109_80). The light-emission signal generating unit 110 of the signal generating circuit 100 transmits, to the light-emitting chips S (S1 to S40), the first light-emission signals φI1 (φI1_1 to φI1_40) and the second light-emission signals φI2 (φI2_1 to φI2_40) through the respective light-emission signal lines 109 (109_1 to 109_80). Additionally, the circuit board 62 is also provided with 80 light-emission current limiting resistors RID that prevent excessive currents from flowing through the respective 80 light-emission signal lines 109 (109_1 to 109_80).

As shown in FIG. 6, the first and second transfer signals φ1 and φ2 are transmitted in common to all the light-emitting chips S (S1 to S40) simultaneously with each other. By contrast, each pair of the first and second light-emission signals φI1 and φI2 is separately transmitted to one of the light-emitting chips S (S1 to S40).

Figure 7:
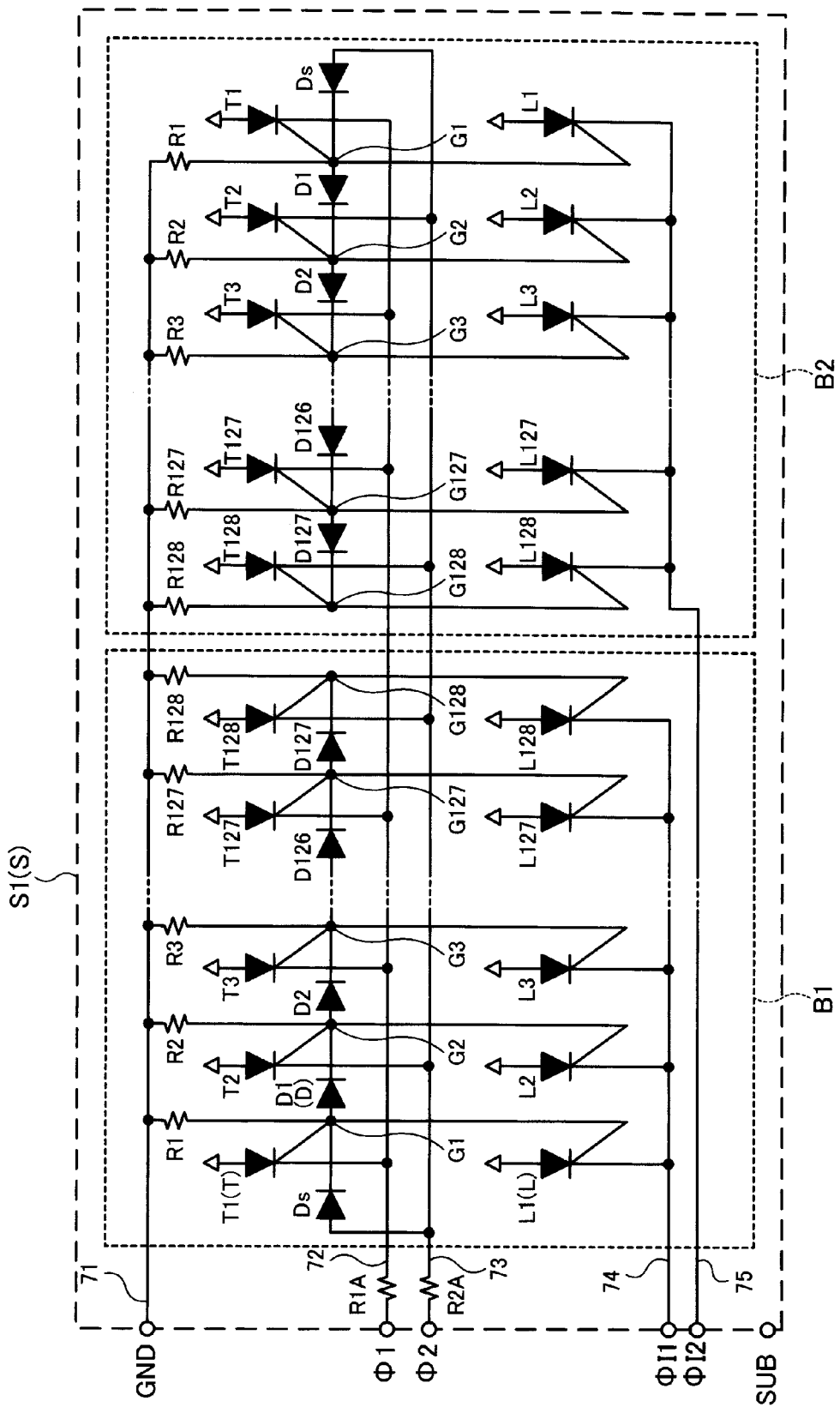
FIG. 7 is a diagram for illustrating an outline of a planar layout and a circuit configuration of each light-emitting chip.

FIG. 7 is a diagram for illustrating an outline of a planar layout and a circuit configuration of each light-emitting chip S. Note that, although hereinafter a description will be given by taking the light-emitting chip S1 as an example, each of the other light-emitting chips S2 to S40 has the same configuration as that of the light-emitting chip S1.

The light-emitting chip S1 includes two light-emitting blocks B (B1 and B2). Each of the light-emitting blocks B1 and B2 is a self-scanning light-emitting element array (self-scanning light emitting device: SLED). That is, the light-emitting chip S1 has two SLEDs.

The light-emitting blocks B1 and B2 have the same configuration except that the light-emitting blocks B1 and B2 are separately supplied with the light-emission signals φI1 and φI2, respectively. The portions having the same configuration are symmetrically arranged in FIG. 7. Hereinafter, the planar layout and the circuit configuration of each light-emitting chip S will be described by taking the light-emitting block B1 of the light-emitting chip S1 as an example.

The light-emitting block B1 includes 128 transfer thyristors T (T1 to T128) and 128 light-emitting thyristors L (L1 to L128). In addition, the light-emitting block B1 further includes 127 diodes D (D1 to D127), a start diode Ds and 128 resistors R (R1 to R128).

When need not be distinguished from one another, the transfer thyristors T1 to T128 will be referred to as transfer thyristors T. When need not be distinguished from one another, the light-emitting thyristors L1 to L128 will be referred to as light-emitting thyristors L. Similarly, when need not be distinguished from one another, the diodes D1 to D127 will be referred to as diodes D. When need not be distinguished from one another, the resistors R1 to R128 will be referred to as resistors R.

In the light-emitting block B1, the light-emitting thyristors L1 to L128 are one-dimensionally arrayed in the order of L1, L2, ..., L127, L128 from the left to the right of FIG. 7. Similarly, the transfer thyristors T1 to T128 are also one-dimensionally arrayed in the order of T1, T2, ..., T127, T128 from the left to the right of FIG. 7. In addition, the diodes D1 to D127 are also arrayed in the order of D1, D2, ..., D126, D127 from the left to the right of FIG. 7. Furthermore, the resistors R1 to R128 are also arrayed in the order of R1, R2, ..., R127, R128 from the left of FIG. 7.

Note that, in the light-emitting block B2, the array orders of the light-emitting thyristors L, the transfer thyristors T, the diodes D and the resistors R are reverse to those in the light-emitting block B1, that is, in the ascending numerical order from the right to the left of FIG. 7. As will be described later, in each of the light-emitting blocks B1 and B2, light emission of the light-emitting thyristors L1 to L128 is controlled in the order from L1 to L128. Accordingly, the light-emission control is sequentially performed from the left to the right of FIG. 7 in the light-emitting block B1, and from the right to the left of FIG. 7 in the light-emitting block B2.

In addition, the light-emitting chip S1 further includes transfer current limiting resistors R1A and R2A that prevent excessive currents from flowing through the signal lines (first and second transfer signal lines 107 and 108) through which the respective first and second transfer signals φ1 and φ2 are supplied.

The light-emitting chip S1 includes 256 light-emitting thyristors L in total in the light-emitting blocks B1 and B2.

Next, a description will be given of electrical connections among the elements in the light-emitting block B1 of the light-emitting chip S1.

Anode terminals of the transfer thyristors T1 to T128 and the light-emitting thyristors L1 to L128 are connected to a board of the light-emitting chip S1. Thereby, these anode terminals are connected to the power supply line 105 (see FIG. 6) via the SUB terminal provided on the board. The Vcc potential (3.3 V) is supplied through the power supply line 105.

Meanwhile, gate terminals G1 to G128 of the transfer thyristors T1 to T128 are connected to a power supply line 71 via the respective resistors R1 to R128, which are provided for the respective transfer thyristors T1 to T128. Thereby, the gate terminals G1 to G128 are connected to the GND terminal. The GND terminal is connected to the power supply line 106 (see FIG. 6) and supplied with the GND potential (0 V) therethrough.

Cathode terminals of the odd-numbered transfer thyristors T1, T3, ..., T127 are connected to a first transfer signal line 72, and thus connected to a φ1 terminal via the transfer current limiting resistor R1A. The φ1 terminal, which is an input terminal for the first transfer signal φ1, is connected to the first transfer signal line 107 (see FIG. 6), and supplied with the first transfer signal φ1 therethrough.

On the other hand, cathode terminals of the even-numbered transfer thyristors T2, T4, . . . , T128 are connected to a second transfer signal line 73, and thus connected to a φ2 terminal via the transfer current limiting resistor R2A. The φ2 terminal, which is an input terminal for the second transfer signal φ2, is connected to the second transfer signal line 108 (see FIG. 6), and supplied with the second transfer signal φ2 therethrough.

Additionally, the gate terminals G1 to G128 of the transfer thyristors T1 to T128 are connected to gate terminals of the respective light-emitting thyristors L1 to L128 in one-to-one correspondence. Accordingly, the gate terminals of the light-emitting thyristors L1 to L128 will not hereinafter be distinguished from the gate terminals G1 to G128 of the transfer thyristors T1 to T128, and thus will be also referred to as gate terminals G1 to G128, respectively. Moreover, when need not be distinguished from one another, the gate terminals G1 to G128 will be referred to as gate terminals G.

Furthermore, the gate terminals G1 to G127 of the transfer thyristors T1 to T127 are connected to anode terminals of the diodes D1 to D127, respectively. The gate terminals G2 to G128 of the transfer thyristors T2 to T128 are connected to cathode terminals of the diodes D1 to D127, respectively. That is, the diodes D1 to D127 are connected in series with one of the diodes D1 to D127 interposed between each adjacent two of the gate terminals G1 to G128.

In addition, the gate terminal G1 of the transfer thyristor T1 is connected to a cathode terminal of the start diode Ds. Meanwhile, an anode terminal of the start diode Ds is connected to the second transfer signal line 73, and thus supplied with the second transfer signal φ2 via the transfer current limiting resistor R2A.

Cathode terminals of the light-emitting thyristors L1 to L128 are connected to a first light-emission signal line 74, and thus connected to a φI1 terminal. The φI1 terminal is connected to the light-emission signal line 109 (see FIG. 6: the light-emission signal line 109_1 for the light-emitting block B1 in the light-emitting chip S1), and supplied with the first light-emission signal φI1 (see FIG. 6: the first light-emission signal φI1_1 for the light-emitting block B1 in the light-emitting chip S1) therethrough.

Note that, in the light-emitting block B2, cathode terminals of the light-emitting thyristors L1 to L128 are connected to a second light-emission signal line 75, and thus connected to a φI2 terminal. The φI2 terminal is connected to the light-emission signal line 109 (see FIG. 6: the light-emission signal line 109_2 for the light-emitting block B2 in the light-emitting chip S1), and supplied with the second light-emission signal φI2 (see FIG. 6: the second light-emission signal φI2_1 for the light-emitting block B2 in the light-emitting chip S1) therethrough.

That is, in the light-emitting chip S1, the first and second light-emission signals φI1 and φI2, which are different from each other, are supplied to the respective light-emitting blocks B1 and B2.

By contrast, in the light-emitting chip S1, the power supply line 71 and the first and second transfer signal lines 72 and 73 are used in common in the light-emitting blocks B1 and B2. Accordingly, by using the pair of the first and second transfer signals φ1 and φ2, the two light-emitting blocks B1 and B2 in the light-emitting chip S1 are driven in synchronization with each other and in parallel.

Next, an operation of the light-emitting portion 63 will be described. Note that, as shown in FIG. 6, the pair of the first and second transfer signals φ1 and φ2 is supplied in common to the light-emitting chips S (S1 to S40) forming the light-emitting portion 63. Meanwhile, based on image data, the light-emitting chips S (S1 to S40) are separately supplied with the respective first light-emission signals φI1 (φI1_1 to φI1_40) and the respective second light-emission signals φI2 (φI2_1 to φI2_40).

That is, although the first and second light-emission signals φI1 and φI2 are different from each other, the light-emitting chips S (S1 to S40) are supplied with the pair of the first and second transfer signals φ1 and φ2 in common. By using these signals, the light-emitting chips S (S1 to S40) are driven in synchronization with one another and in parallel.

Accordingly, as for the operations of the light-emitting portion 63, only the first and second light-emission signals φI1 and φI2 are different among the light-emitting chips S (S1 to S40). Thus, it will be sufficient to describe the operation of the light-emitting chip S1. In addition, between the two light-emitting blocks B1 and B2 in the light-emitting chip S1, only the first and second light-emission signals φI1 and φI2 are different. Thus, it will be sufficient to describe the operation of the light-emitting block B1. Hereinafter, the operation of the light-emitting portion 63 will be described by taking the light-emitting block B1 as an example.

Figure 8:
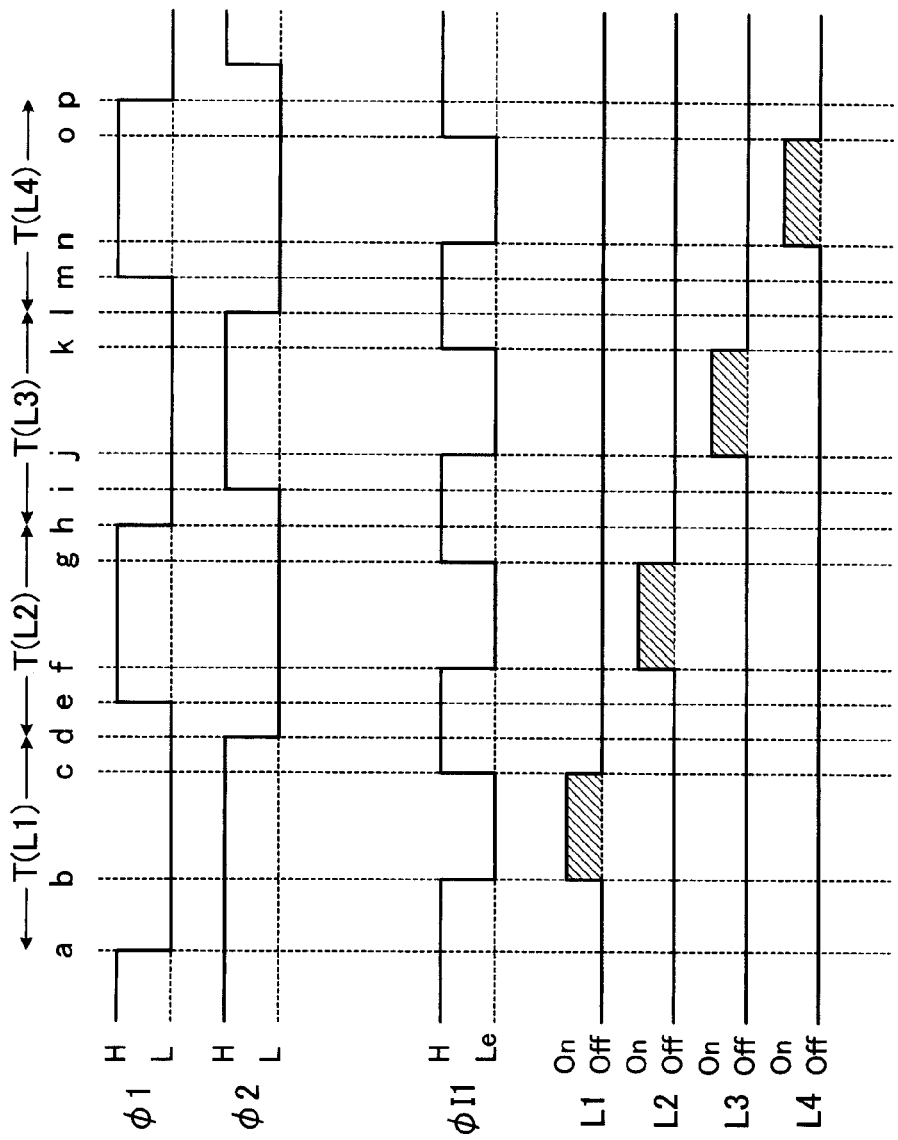
FIG. 8 is a timing chart for illustrating the operation of the light-emitting block in the light-emitting chip.

FIG. 8 is a timing chart for illustrating the operation of the light-emitting block B1 in the light-emitting chip S1. Assume here that time flows from a time point a to a time point p in alphabetical order.

FIG. 8 focuses on light-emission control on the light-emitting thyristors L1 to L4 in the light-emitting block B1. In the following description, all these light-emitting thyristors L1 to L4 are assumed to be caused to "emit light (be turned on)."

Firstly, waveforms of the signals driving the light-emitting block B1 will be described.

As will be described later, the light-emission and non-light-emission of the light-emitting thyristors L1 to L128 are controlled (light-emission control) in order on a single thyristor basis. Accordingly, assume here that the light-emission and non-light-emission of each of the light-emitting thyristors L1 to L4 is controlled during a period T as a cycle. Specifically, during a period T (L1) from the time point a to a time point d, the light-emission control is performed on the light-emitting thyristor L1. During a period T(L2) from the time point d to a time point h, the light-emission control is performed on the light-emitting thyristor L2. During a period T(L3) from the time point h to a time point 1, the light-emission control is performed on the light-emitting thyristor L3. During a period T(L4) from the time point 1 to the time point p, the light-emission control is performed on the light-emitting thyristor L4.

The period T (L1) in FIG. 8 is not only a light-emission control period for the light-emitting thyristor L1, but also a period in which the drive of the light-emitting block B1 starts. Thus, the signals have different waveforms in the period T(L1) from those in the subsequent periods. Hence, the signal waveforms will hereinafter be outlined by using the signal waveforms in the periods T(L3) and T(L4), which are repeated in the subsequent periods.

Each of the first and second transfer signals φ1 and φ2 repeats a cycle of total period (2×T) of the periods T (L3) and T (L4). Thus, a description will be given by using the total period of the periods T(L3) and T(L4) (from the time point h to the time point p) as a unit period.

The first transfer signal φ1 transitions from a high level (hereinafter, referred to as "H") to a low level (hereinafter, referred to as "L") at the time point h, and then from "L" to "H" at a time point m. During the other part of the unit period, the first transfer signal φ1 is set to "H."

The second transfer signal φ2 is set to "L" at the time point h, and transitions from "L" to "H" at a time point i, and then transitions from "H" to "L" at the time point 1. The second transfer signal φ2 is kept at "L" at the time point p.

Here, comparison between the first and second transfer signals φ1 and φ2 shows that the second transfer signal φ2 is obtained by shifting the first transfer signal φ1 along the time axis to the right in FIG. 8 by a length equivalent to the period T.

The first and second transfer signals φ1 and φ2 are both set to "L" during a period from the time point h, which is the start point of the period T (L3), to the time point i, and during a period from the time point 1, which is the start point of the period T (L4), to the time point m. That is, the first and second transfer signals φ1 and φ2 are both set to "L" at the start point of each period T.

Meanwhile, the first light-emission signal φI1 has a cycle of period T. In the period T(L3), the first light-emission signal φI1 is set to "H" at the time point h, and transitions to a low level of the first light-emission signal φI1 (hereinafter, referred to as "Le") at a time point j, and then from "Le" to "H" at a time point k. The first light-emission signal φI1 is kept at "H" at the time point 1, which is the start point of the period T (L4). In the period T(L4), the first light-emission signal φI1 transitions from "H" to "Le" at a time point n, and from "Le" to "H" at a time point o.

The first light-emission signal φI1 is set to "Le" during which only either the first transfer signal φ1 or the second transfer signal φ2 is set to "L" (during a period from the time point i to the time point 1 for the first transfer signal φ1, and during a period from the time point m to the time point p for the second transfer signal φ2).

Hereinafter, based on FIG. 8 and with reference to FIG. 7, the operation of each light-emitting block B will be described by taking the light-emitting block B1 as an example.

Firstly, a description will be given of an operation of each thyristor (transfer thyristor or light-emitting thyristor) by assuming the potential of an anode terminal of the thyristor as reference. When a potential lower than a threshold voltage is applied to the cathode terminal of a thyristor, the thyristor gets turned on. The threshold voltage of a thyristor is a value obtained by subtracting a diffusion potential Vd of the pn junction from the potential of the gate terminal G of the thyristor.

When the thyristor gets turned on, the potential of the gate terminal G of the thyristor becomes equal to the potential (anode potential) of the anode terminal. Meanwhile, the potential of the cathode terminal of the turned-on thyristor becomes equal to the diffusion potential Vd of the pn junction.

Once turned on, the thyristor is kept turned on until the potential of the cathode terminal exceeds a potential required to keep the thyristor turned on. For example, if the potential of the cathode terminal is set equal to the potential of the anode terminal, the thyristor is disabled to be kept turned on, and thus gets turned off.

When the light-emitting block B1 is instructed to start the operation (at the time point a), the SUB terminal in the light-emitting block B1 is set to "H" (Vcc potential of 3.3 V), and the GND terminal is set to "L" (0 V). In addition, the transfer signal generating unit 120 sets the first and second transfer signals φ1 and φ2 to "H." The light-emission signal generating unit 110 sets the first light-emission signals φI1 (φI1_1 to φI1_40) and the second light-emission signals φI2 (φI2_1 to φI2_40) to "H."

Then, "H" (3.3 V) is supplied to the anode terminals of the transfer thyristors T1 to T128 and the light-emitting thyristors L1 to L128 in the light-emitting block B1, since these anode terminals are connected to the SUB terminal. Meanwhile, the cathode terminals of the transfer thyristors T1 to T128 are connected to either of the first and second transfer signals φ1 and φ2 both of which are set to "H" (3.3 V). Accordingly, the anode terminal and the cathode terminal of each of the transfer thyristors T1 to T128 are both set to "H," and thus all the transfer thyristors T1 to T128 are turned off. Similarly, the cathode terminals of the light-emitting thyristors L1 to L128 are connected to the light-emission signal φI that is set to "H." Accordingly, the anode terminal and the cathode terminal of each of the light-emitting thyristors L1 to L128 are both set to "H," and thus all the light-emitting thyristors L1 to L128 are turned off.

On the other hand, the gate terminals G1 to G128 of the transfer thyristors T and the light-emitting thyristors L are connected to the GND terminal via the resistors R1 to R128, respectively, and thus set to "L" (GND potential of 0 V).

The cathode terminal of the start diode Ds, which is connected to the gate terminal G1, is set to "L." Meanwhile, the anode terminal of the start diode Ds is set to "H." Thus, the start diode Ds, which is connected to the second transfer signal φ2, is forward biased.

Then, since the start diode Ds is forward biased, the potential of the gate terminal G1 is set to a value obtained by subtracting the diffusion potential Vd of the pn junction from "H" (3.3 V), which is the potential of the anode terminal of the start diode Ds. For example, when the light-emitting element chips S are formed of GaAs, the diffusion potential Vd is 1.5 V, and thus the potential of the gate terminal G1 is set to 1.8 V. Accordingly, the threshold voltage of the transfer thyristor T1 is 0.3 V.

Next, the gate terminal G2 is connected to the gate terminal G1 via the diode D1. Accordingly, the potential of the gate terminal G2 is set to 0.3 V, which is obtained by subtracting the diffusion potential Vd (1.5 V) of the pn junction from the potential (1.8 V) of the gate terminal G1. Thus, the threshold voltage of the transfer thyristor T2 is −1.2 V. The effect of the potential change of the gate terminal G1 does not reach the gate terminals G3, . . . , G128, which thus remain 0 V. Accordingly, the threshold voltage of each of the transfer thyristors T3, T4, . . . , T128 is −1.5 V.

Note that the gate terminals G1, G2, . . . , G128 of the light-emitting thyristors L1, L2, . . . , L128 are connected to the gate terminals G1, G2, . . . , G128 of the transfer thyristors T1, T2, . . . , T128, respectively. Thus, the threshold voltages of the light-emitting thyristors L1, L2, . . . , L128 are the same as those of the transfer thyristors T1, T2, . . . , T128 to which the gate terminals G1, G2, . . . , G128 are connected, respectively.

Next, a description will be given of the period T(L1) during which the light-emitting thyristor L1 is controlled.

At the time point a, the first transfer signal φ1 transitions from "H" (3.3 V) to "L" (0 V). In response, the transfer thyristor T1 whose cathode terminal is connected to the first transfer signal φ1 gets turned on, since the threshold voltage thereof is 0.3 V.

However, the transfer thyristor T3 whose cathode terminal is connected to the first transfer signal φ1 is not allowed to get turned on, since the threshold voltage thereof is −1.5 V.

That is, at the time point a, it is only the transfer thyristor T1 that is allowed to get turned on.

Note that, at the time point a, the even-numbered transfer thyristors T2, T4, . . . , T128 are not allowed to get turned on either, since the second transfer signal φ2 is kept at "H."

When the transfer thyristor T1 gets turned on, the potential of the gate terminal G1 rises to "H" (3.3 V), which is the potential of the anode terminal. This makes the diode D1 more forward biased, and thus sets the potential of the gate terminal G2 to 1.8 V. As a result, the threshold voltage of the transfer thyristor T2 becomes 0.3 V.

On the other hand, the gate terminal G1 of the light-emitting thyristor L1 is set to 3.3 V, since it is the gate terminal G1 of the transfer thyristor T1 as described above. The threshold voltage of the light-emitting thyristor L1 is 1.8 V.

Meanwhile, the potential of the gate terminal G2 of the light-emitting thyristor L2 (equal to that of the gate terminal G2 of the transfer thyristor T2) is 1.8 V, and thus the threshold voltage of the light-emitting thyristor L2 is 0.3 V. The potential of the gate terminal G3 of the light-emitting thyristor L3 is 0.3 V, and thus the threshold voltage of the light-emitting thyristor L3 is −1.2 V. The potential of the gate terminal of each of the following light-emitting thyristors L4, . . . , L128 is 0 V, and thus the threshold voltage of each of the light-emitting thyristors L4, . . . , L128 is −1.5 V.

Thus, at a time point b, only the light-emitting thyristor L1 is allowed to emit light, by setting the potential of the first light-emission signal φI1 to a value between 1.8 V and 0.3 V. The potential between 1.8 V and 0.3 V is referred to as "Le," herein.

Then, at a time point c, the potential of the first light-emission signal φI1 is set back to "H" (3.3 V). This causes the anode terminal and the cathode terminal of the light-emitting thyristor L1 to have the same potential. Thus the light-emitting thyristor L1 stops emitting light.

At this time, the transfer thyristor T1 remains turned on.

Next, a description will be given of the period T(L2) during which the light-emitting thyristor L2 is controlled.

As described above, the threshold voltage of the transfer thyristor T2 is set to 0.3 V.

Accordingly, at the time point d, the second transfer signal φ2 is set to "L" (0 V), which is lower than 0.3 V of the threshold voltage of the transfer thyristor T2. This turns on the transfer thyristor T2, and thus the potential of the gate terminal G2 becomes 3.3 V. Then, due to the diode D2, the potential of the gate terminal G3 becomes 1.8 V.

However, the transfer thyristor T3 does not get turned on since the potential of the first transfer signal line 72 is fixed to 1.8 V by the turned-on transfer thyristor T1.

Furthermore, when the transfer thyristor T2 gets turned on, the potential of the gate terminal G2 rises to 3.3 V. This sets the threshold voltage of the light-emitting thyristor L2 to 1.8 V.

Note that, at this time point d, the transfer thyristor T1 remains turned on.

Then, at a time point e, the first transfer signal φ1 is set to "H." This sets both the anode terminal and the cathode terminal of the transfer thyristor T1 to "H." Thus, the transfer thyristor T1 is no longer kept turned on, and thus gets turned off. As a result, the potential of the gate terminal G1 drops from "H" (3.3 V) to "L" of the GND potential (0 V). Since the potential of the gate terminal G2 is set to "H" (3.3 V) at this time, the diode D1 gets reverse biased.

Meanwhile, the cathode terminal of the transfer thyristor T3 also becomes "H," which sets both the anode terminal and the cathode terminal of the transfer thyristor T3 to "H." Accordingly, the transfer thyristor T3 does not get turned on.

Thus, at a time point f, the first light-emission signal φI1 is set to "Le" (the potential between 0.3 V and 1.8 V). This causes only the light-emitting thyristor L2 to emit light, and the other light-emitting thyristors L1, L3, L128 not to emit light. At this time, the transfer thyristor T2 remains turned on.

Then, at a time point g, the first light-emission signal φI1 is set to "H." This sets both the anode terminal and the cathode terminal of the light-emitting thyristor L2 to "H." Thus, the light-emitting thyristor L2 is disabled to continue to emit light any longer, and thus stops emitting light. At this time point, the transfer thyristor T2 remains turned on.

Next, a description will be given of the period T(L3) during which the light-emitting thyristor L3 is controlled.

As described above, at the time point h, the potential of the gate terminal G3 of the transfer thyristor T3 is 1.8 V, and the threshold voltage thereof is 0.3 V. Accordingly, by setting the first transfer signal φ1 to "L" (0 V), the transfer thyristor T3 get turned on. Thus the potential of the gate terminal G3 of the transfer thyristor T3 becomes 3.3 V. Then, due to the diode D3, the potential of the gate terminal G4 becomes 1.8 V. At this time, the transfer thyristors T2 and T3 are both turned on.

Then, at the time point i, the second transfer signal φ2 is set to "H." This sets both the anode terminal and the cathode terminal of the transfer thyristor T2 to "H." Thus, the transfer thyristor T2 is no longer kept turned on, and thus gets turned off.

At this time, the threshold voltage of the light-emitting thyristor L3 is 1.8 V since the potential of the gate terminal G3 is 3.3 V. Accordingly, at the time point j, the first light-emission signal φI1 is set to "Le." This causes the light-emitting thyristor L3 to emit light.

Thereafter, at the time point k, the first light-emission signal φI1 is set to "H." This sets both the anode terminal and the cathode terminal of the light-emitting thyristor L3 to "H." Thus, the light-emitting thyristor L3 is disabled to continue to emit light any longer, and thus stops emitting light.

After that, in the period T (L4) starting from the time point 1, the same operation as that in the period T(L2) starting from the time point d is performed. That is, the subsequent operations may be performed by alternately repeating the periods T(L2) and T(L3).

As described above, when one of the transfer thyristors T gets turned on in response to one of the paired transfer signals (the first transfer signal φ1 or the second transfer signal φ2), the potential of the gate terminal G thereof becomes "H." This causes the diode D connected to the transfer thyristor T to be forward biased, and thus changes the potential of the gate terminal G of another one (which is assigned a number larger by one than the transfer thyristor T) of the transfer thyristors T that is connected to the diode D. As a result, the threshold voltage of the latter transfer thyristor T is lowered. Thereafter, the other one of the paired transfer signals (the first transfer signal φ1 or the second transfer signal φ2) turns on the latter transfer thyristor T (assigned the number larger by one than the former transfer thyristor T). In this way, by using the pair of the first and second transfer signals φ1 and φ2, the turned-on state is propagated (transferred) among the transfer thyristors T in the ascending numerical order.

Moreover, along with the change in the potential of the gate terminal G of each transfer thyristor T, the threshold voltage of the light-emitting thyristor L connected to the gate terminal G is lowered. Accordingly, the light-emission and non-light-emission of the light-emitting thyristor L are controllable based on image data, by setting the first light-emission signal φI1 (or the second light-emission signal φI2) to "Le," which leads to "light-emission," or by keeping the light-emission signal at "H," which leads to "non-light-emission."

Hereinbefore, the operation of the light-emitting block B1 has been described. By using the pair of the first and second transfer signals φ1 and φ2, the two light-emitting blocks B1 and B2 forming the light-emitting chip S1 are driven in synchronization with each other and in parallel, as described above. Meanwhile, based on image data, the first and second light-emission signals φI1 and φI2 are separately transmitted to the respective light-emitting blocks B1 and B2. Accordingly, the light-emission and non-light-emission of the light-emitting thyristors L1 to L128 are controlled on a single block basis.

Moreover, by using the pair of the first and second transfer signals φ1 and φ2, the light-emitting chips S (S1 to S40) forming the light-emitting portion 63 are driven in synchronization with one another and in parallel. Meanwhile, based on image data, the light-emitting chips S (S1 to S40) are separately supplied with the respective first light-emission signals φI1 (φI1_1 to φI1_40), and the respective second light-emission signals φI2 (φI2_1 to φI2_40). Accordingly, the light-emission and non-light-emission of the light-emitting thyristors L1 to L128 in each of the light-emitting blocks B1 and B2 of the light-emitting chips S (S1 to S40) are controlled on a single chip basis.

Hereinafter, a description will be given of the reason why noise generation due to charge and discharge of each bypass capacitor C is suppressed in the present exemplary embodiment.

In an electrical circuit (LSI), especially in a digital circuit, upon transition of a signal, a large current flows in the circuit. Then, a drop in a power supply voltage occurs, since the current amount supplied by the power supply may become insufficient. As a result, malfunction of the electrical circuit (LSI) is caused. In order to prevent such a voltage drop, a bypass capacitor accumulating a certain amount of charge is provided near the electrical circuit (LSI), and thereby instantaneous current supply capability is added.

In this configuration, the bypass capacitor repeats charge and discharge every time a signal transitions. In response to the discharge and discharge of the bypass capacitor, a current flows in the circuit, and thus a magnetic field is generated. The temporally varying magnetic field induces back electromotive force in the circuit around the bypass capacitor.

This back electromotive force provides noise (electromagnetic noise) in the electrical circuit (LSI), and this noise causes malfunction of the electrical circuit (LSI).

Here, in the light-emitting device 65 to which the present exemplary embodiment is applied, the light-emitting chips S (S1 to S40) are driven in synchronization with one another and in parallel by using the pair of the first and second transfer signals φ1 and φ2. Accordingly, the timing at which a current flow in a light-emitting chip S causes change in the power supply potential might overlap (change in the power supply potential might be caused at the same time) among the light-emitting chips S (S1 to S40). This causes the timing of charge and discharge of the bypass capacitors C to overlap.

Then, the magnetic fields generated by charge and discharge of these bypass capacitors C might be superimposed to induce large back electromotive force, which might provide noise to cause malfunction of the electrical circuits such as the signal generating circuit 100, for example.

In particular, as shown in FIG. 3A, the light-emitting device 65 is formed of the multiple light-emitting chips S one-dimensionally arrayed in the longitudinal direction of the circuit board 62. Thus, as shown in FIG. 3B, the multiple bypass capacitors C are provided along the array of the light-emitting chips S so as to suppress the change both in the GND potential supplied to the GND terminals of the respective light-emitting chips S and in the Vcc potential supplied to the SUB terminals thereof.

FIGS. 9A and 9B are equivalent circuits for illustrating magnetic fields generated by charge and discharge of the bypass capacitors C in the light-emitting device 65 to which the present exemplary embodiment is applied. FIG. 9A shows a case where currents flow to charge the bypass capacitors C, while FIG. 9B shows a case where currents flow to discharge the bypass capacitors C.

FIGS. 9A and 9B are diagrams illustrating the bypass capacitors C2 to C5 as an example as in FIG. 5. FIGS. 9A and 9B are equivalent circuits seen from the back surface of the circuit board 62 as in FIG. 3B.

In each of FIGS. 9A and 9B, the Vcc layer 302 and the GND layer 303 in the circuit board 62 are shown as an interconnect line (Vcc) at the upper side of the figure and an interconnect line (GND) at the lower side of the figure, respectively. Each adjacent two of the bypass capacitors C are physically arranged in parallel, while the electrodes (the GND electrodes 201 and the Vcc electrodes 202) thereof are alternately positioned.

Based on FIG. 9A, a description will be given of the case where the bypass capacitors C are charged.

In charging the bypass capacitors C, currents flow from the Vcc layer 302 toward the bypass capacitors C. At this time, currents I2c and I4c flow through the respective bypass capacitors C2 and C4 from upward to downward in FIG. 9A. Accordingly, magnetic fields H directed clockwise with respect to the directions of the currents are generated around the bypass capacitors C2 and C4, respectively. As a result, in the inside of the circuit board 62 (backward of the paper), magnetic fields H2c and H4c directed clockwise in the longitudinal direction of the circuit board 62 are generated.

By contrast, currents I3c and I5c flow through the respective bypass capacitors C3 and C5 from downward to upward in FIG. 9A. As a result, in the inside of the circuit board 62, magnetic fields H3c and H5c directed counterclockwise in the longitudinal direction of the circuit board 62 are generated.

The directions of the magnetic fields H2c and H4c are reversed from that of the magnetic fields H3c and H5c.

The light-emitting chips S (S1 to S40) are driven in synchronization with one another and in parallel by using the pair of the first and second transfer signals φ1 and φ2, as described above. Accordingly, it may be considered that the currents for charging the respective bypass capacitors C vary little in amount from one another, and thus that the generated magnetic fields also vary little in strength from one another. As a result, the magnetic fields generated in the longitudinal direction of the circuit board 62 are canceled out between each adjacent two bypass capacitors C. For example, the magnetic fields H2c and H4c are considered to cancel out the magnetic fields H3c and H5c, respectively.

Based on FIG. 9B, a description will be given of the case where the bypass capacitors C are discharged.

In discharging the bypass capacitors C, currents flow from the bypass capacitors C toward the Vcc layer 302. That is, currents (I2d to I5d) flow in the reverse directions of the currents (I2c to I5c) for charging the bypass capacitors C, respectively. Accordingly, the directions of the magnetic fields H generated by the respective currents are also reversed. As a result, the directions of the respective magnetic fields (H2d to H5d) in the inside of the circuit board 62 are also reversed.

However, the magnetic fields H2d to H5d have a relationship to be canceled out between each adjacent two bypass capacitors C as in the case of charging the bypass capacitors C.

As described above, in the present exemplary embodiment, the magnetic fields generated around the bypass capacitors C have a relationship to be canceled out between one another. Accordingly, the present exemplary embodiment is capable of reducing back electromotive force generated in the electrical circuits such as the signal generating circuit 100, and thus suppressing generation of noise therein.

FIGS. 10A and 10B are equivalent circuits for illustrating magnetic fields generated by charge and discharge of the bypass capacitors C in the light-emitting device 65 to which the present exemplary embodiment is not applied. FIG. 10A shows the case where currents flow to charge the bypass capacitors C, while FIG. 10B shows the case where currents flow to discharge the bypass capacitors C. Note that FIGS. 10A and 10B are diagrams illustrating the bypass capacitors C2 to C5 as an example as in FIG. 5. FIGS. 10A and 10B are equivalent circuits seen from the back surface of the circuit board 62 as in FIG. 3B.

As in FIGS. 9A and 9B, in each of FIGS. 10A and 10B, the Vcc layer 302 and the GND layer 303 in the circuit board 62 are shown as an interconnect line (Vcc) at the upper side of the figure and an interconnect line (GND) at the lower side of the figure, respectively. Each adjacent two of the bypass capacitors C are physically arranged in parallel. In addition, each of the GND electrodes 201 of the bypass capacitors C and each of the Vcc electrodes 202 thereof are placed on the respective sides.

Based on FIG. 10A, a description will be given of the case where the bypass capacitors C is charged.

In charging the bypass capacitors C, currents flow from the Vcc layer 302 toward the bypass capacitors C. At this time, the currents I2c to I5c flow through the respective bypass capacitors C2 to C5 in the same direction (from upward to downward in FIG. 10A). Accordingly, magnetic fields H generated by the currents I2c to I5c are directed in the same direction. As a result, in the inside of the circuit board 62 (backward of the paper), the magnetic fields (H2c to H5c) directed clockwise in the longitudinal direction of the circuit board 62 are generated. Directed in the same direction, the magnetic fields (H2c to H5c) are not canceled out, but superimposed to generate a magnetic field Hc directed clockwise in FIG. 10A.

Based on FIG. 10B, a description will be given of the case where the bypass capacitors C are discharged.

In discharging the bypass capacitors C, currents flow from the bypass capacitors C toward the Vcc layer 302. That is, the currents (I2d to I5d) flow in the reverse directions of the currents (I2c to I5c) for charging the bypass capacitors C, respectively. Specifically, the currents I2d to I5d flow through the respective bypass capacitors C2 to C5 in the same direction (from upward to downward in FIG. 10B). Accordingly, the directions of the magnetic fields H generated by the respective currents are also reversed, and thus are directed in the same direction among the bypass capacitors C2 to C5. As a result, in the inside of the circuit board 62 (backward of the paper), the magnetic fields (H2d to H5d) directed counterclockwise in the longitudinal direction of the circuit board 62 are generated. Directed in the same direction as one another, the magnetic fields (H2d to H5d) are not canceled out, but superimposed to generate a magnetic field Hd directed counterclockwise in FIG. 10B.

That is, in the light-emitting device 65 to which the present exemplary embodiment is not applied, the clockwise magnetic field Hc and the counterclockwise magnetic field Hd are alternately generated in the longitudinal direction of the circuit board 62 every time the bypass capacitors C repeats charge and discharge. The temporally varying magnetic field induces back electromotive force in the electrical circuits such as the signal generating circuit 100, and thus causes noise therein.

As described above, in the present exemplary embodiment, between each adjacent two bypass capacitors C, the GND electrode 201 and the Vcc electrode 202 are alternately positioned. Accordingly, the magnetic fields generated by charge and discharge of the bypass capacitors C in the inside of the circuit board 62 in the longitudinal direction are canceled out between each adjacent two bypass capacitors C. Thus, the present exemplary embodiment is capable of reducing back electromotive force that a temporally varying magnetic field induces in the electrical circuits such as the signal generating circuit 100, and thus suppressing generation of noise (electromagnetic noise) therein.

Note that, in the present exemplary embodiment, the 21 bypass capacitors C are provided so that the GND electrodes 201 and the Vcc electrodes 202 are alternately positioned between each adjacent two bypass capacitors C. It is highly effective to provide all the bypass capacitors C so that the GND electrodes 201 and the Vcc electrodes 202 are alternately positioned between each adjacent two bypass capacitors C. However, all the bypass capacitors C need not necessarily be alternately provided.

For example, the bypass capacitors C that are not inverted with respect to one another may be partially arrayed in parallel.

In addition, although provided for every two light-emitting chips S in the present exemplary embodiment, a bypass capacitor C may be provided for each light-emitting chip S. Instead, the bypass capacitors C may be provided irrespective of the number of light-emitting chips S.

Moreover, the bypass capacitors C need not necessarily be provided at regular intervals in the light-emitting device 65. The bypass capacitors C may be provided at positions other than those provided with the signal generating circuit 100 and the connectors.

Although arrayed on a single capacitor basis in the present exemplary embodiment, the bypass capacitors C may be arrayed on a group basis each including the bypass capacitors C that are not inverted with respect to one another.

In addition, although a ceramic capacitor is used as each bypass capacitor C in the present exemplary embodiment, the bypass capacitor C may be another capacitor such as a tantalum capacitor, a film capacitor and an electrolytic capacitor.

Moreover, although using the light-emitting thyristors L in the present exemplary embodiment, each light-emitting chip S may alternatively use other light-emitting elements such as light emitting diodes, organic electroluminescence elements or inorganic electroluminescence elements.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light-emitting device comprising:
   a board;
   a plurality of light-emitting chips that are one-dimensionally arrayed in a longitudinal direction of the board and that are connected to a first potential and a second potential, and are driven in parallel; and
   a plurality of capacitors that each include a first electrode and a second electrode arranged in a line parallel to a short-side direction of the board, the plurality of capacitors being arrayed in the longitudinal direction of the board along the array of the plurality of light-emitting chips such that the first electrodes and the second electrodes of adjacent capacitors are alternately positioned in an inverted relationship relative to each other, the first electrode of each capacitor being connected to the first potential for the light-emitting chips, and the second electrode of each capacitor being connected to the second potential for the light-emitting chips.

2. The light-emitting device according to claim 1, wherein the plurality of light-emitting chips are provided on a front surface of the board, and the plurality of capacitors are provided on a back surface of the board.

3. The light-emitting device according to claim 1, wherein each of the plurality of light-emitting chips includes a self-scanning light-emitting element array in which a plurality of light-emitting thyristors are one-dimensionally arrayed, and the plurality of light-emitting chips are driven in synchronization with one another.

4. A print head comprising:
an exposure unit that includes a light-emitting device and that exposes an image carrier; and
an optical unit that focuses light emitted by the light-emitting device onto the image carrier,
the light-emitting device including:
a board;
a plurality of light-emitting chips that are one-dimensionally arrayed in a longitudinal direction of the board and that are connected to a first potential and a second potential, and are driven in parallel; and
a plurality of capacitors that each include a first electrode and a second electrode arranged in a line parallel to a short-side direction of the board, the plurality of capacitors being arrayed in the longitudinal direction of the board along the array of the plurality of light-emitting chips such that the first electrodes and the second electrodes of adjacent capacitors are alternately positioned in an inverted relationship relative to each other, the first electrode of each capacitor being connected to the first potential for the light-emitting chips, and the second electrode of each capacitor being connected to the second potential for the light-emitting chips.

5. The print head according to claim 4, wherein the plurality of light-emitting chips in the light-emitting device are provided on a front surface of the board, and the plurality of capacitors in the light-emitting device are provided on a back surface of the board.

6. The print head according to claim 4, wherein each of the plurality of light-emitting chips in the light-emitting device includes a self-scanning light-emitting element array in which a plurality of light-emitting thyristors are one-dimensionally arrayed, and the plurality of light-emitting chips are driven in synchronization with one another.

7. An image forming apparatus comprising:
a charging unit that charges an image carrier;
an exposure unit that includes a light-emitting device and that exposes the image carrier;
an optical unit that focuses light emitted by the exposure unit onto the image carrier;
a developing unit that develops an electrostatic latent image formed on the image carrier; and
a transfer unit that transfers an image developed on the image carrier onto a transferred body,
the light-emitting device including:
a board;
a plurality of light-emitting chips that are one-dimensionally arrayed in a longitudinal direction of the board and that are connected to a first potential and a second potential, and are driven in parallel; and
a plurality of capacitors that each include a first electrode and a second electrode arranged in a line parallel to a short-side direction of the board, the plurality of capacitors being arrayed in the longitudinal direction of the board along the array of the plurality of light-emitting chips such that the first electrodes and the second electrodes of adjacent capacitors are alternately positioned in an inverted relationship relative to each other, the first electrode of each capacitor being connected to the first potential for the light-emitting chips, and the second electrode of each capacitor being connected to the second potential for the light-emitting chips.

8. The image forming apparatus according to claim 7, wherein the plurality of light-emitting chips in the light-emitting device are provided on a front surface of the board, and the plurality of capacitors in the light-emitting device are provided on a back surface of the board.

9. The image forming apparatus according to claim 7, wherein each of the plurality of light-emitting chips in the light-emitting device includes a self-scanning light-emitting element array in which a plurality of light-emitting thyristors are one-dimensionally arrayed, and the plurality of light-emitting chips are driven in synchronization with one another.

* * * * *